United States Patent

[11] 3,611,072

[72] Inventor Donald R. Hamilton
Monroeville, Pa.
[21] Appl. No. 853,424
[22] Filed Aug. 27, 1969
[45] Patented Oct. 5, 1971
[73] Assignee Westinghouse Electric Corporation
Pittsburgh, Pa.

[54] MULTICATHODE GATE-TURNOFF SCR WITH INTEGRAL BALLAST RESISTORS
8 Claims, 10 Drawing Figs.

[52] U.S. Cl. .......... 317/235,
317/234 N, 317/235 Z, 317/235 AB
[51] Int. Cl. .......... H01l 5/02,
H01l 9/12, H01l 11/10
[50] Field of Search .......... 317/234,
235, 235 (5), 235 (5.4), 235 (22), 235 (40.13),
235 (41), 235 (41.1), 235 (47), 235 (47.1);
307/303, 252.20, 252.22, 252.26, 305

[56] References Cited
UNITED STATES PATENTS 3,210,621 10/1965 Strull .......... 317/235
3,344,323 9/1967 Einthoven et al. .......... 317/235
3,449,649 6/1969 Irmler et al. .......... 317/235
3,408,545 10/1968 De Cecco et al. .......... 317/235

*Primary Examiner*—John W. Huckert
*Assistant Examiner*—William D. Larkins
*Attorneys*—F. Shapoe and C. L. Menzemer

ABSTRACT: A gate controlled switch has a plurality of cathode regions distributed throughout but electrically isolated from the gate region of the switch. Each cathode region has an integral resistive portion which enables the region to control the last current flow which occurs when the switch is turned off so that each cathode region has two distinct separate regions integral with each other, and each having its own individual function. During normal operation of the switch, substantially all of the forward current flows through essentially all of the cathode except for the integral resistive portion of the region. During turnoff of the switch the last current to flow in the switch is caused to flow through the integral resistive element portion of the cathode region.

WITNESSES
Theodore F. Wrobel
Donald M. Winegar

INVENTOR
Donald R. Hamilton
BY
C. L. Menzemer
ATTORNEY

MULTICATHODE GATE-TURNOFF SCR WITH INTEGRAL BALLAST RESISTORS

BACKGROUND OF THE INVENTION

1. Field of the Invention

This invention relates to high current gate controlled switches.

2. Description of the Prior Art

High current gate controlled switches are know which are designed to turnoff currents of 50 amperes or better and consist of a plurality of cathode regions each of which is encircled by a gate region. Theoretically such a device should be capable of turning off currents of 50 amperes or better. Investigations have shown that although all the cathode regions share the forward current during normal operation, the current does not necessarily distribute itself equally during the turnoff time when a negative pulse is applied to turn off the switch.

The situation which is present is analogous to a set of mechanically parallel switches looking into a constant current load. If the inductance and/or the resistance in the switch leads is so low that the current can redistribute itself faster than the time needed to open all the switches, then there will be a last switch remaining closed which will carry the entire current. If there is sufficient inductance and/or resistance present in each of the switch leads, then the current tends to be shared more evenly among the switches, depending upon the size of the impedances and/or resistors relative to the size of the load.

The prior art high current gate controlled switches do not have any means incorporated within the switch to deliberately distribute the current at shutdown substantially equally among the plurality of cathode regions. Those units sold commercially do not even have a plurality of cathodes and are hence limited to the turnoff capability of a single cathode, i.e. about 10A peak typically, 30A maximum in a carefully designed circuit. To make a higher current switch a plurality of cathodes is desired. When this is done, if one of the cathode regions turns off completely before all of the other cathode regions, the only factor preventing the rerouting of the current through the other cathode regions is the available rate of rise of current in the other cathode regions, that is the rate at which additional carriers can be injected into the cathode regions or the rate at which the size of the conducting cathode region can be expanded in the face of the turnoff drive. Many high current gate controlled switches fail because too many cathode regions turn off completely before the remainder do, causing a surge of current flowing through the one remaining cathode region which is in an "on" condition, exceeding that region's current handling capability thereby burning out that particular cathode region and destroying the high current gate control switch.

An object of this invention is to provide a high current gate controlled switch having the property of turning off currents in excess of 50 amperes.

Another object of this invention is to provide a high current gate controlled switch having a plurality of cathode regions, each of the cathode regions being completely encircled within a gate region and having integral means for causing the current during turnoff to be substantially shared equally among all the cathode regions to prevent the burning out of any of the cathode regions.

Other objects of this invention will, in part, be obvious and will, in part, appear hereinafter.

SUMMARY OF THE INVENTION

In accordance with the teachings of this invention there is provided a high current gate controlled switch comprising a wafer of semiconductor material having a top and a bottom surface. The wafer has a plurality of first regions of first type semiconductivity and a second region of second type semiconductivity exposed on the top surface of the wafer. Each of the plurality of first regions is encircled by a portion of the second region and has a first electrical contact disposed upon and joined in an electrically conductive relationship with the first region. The first contact is disposed on only a portion of the surface of the first region to which it is joined. The remaining part of each of the first regions is an unmetallized integral resistive element. A second electrical contact is joined to the second region in an electrically conductive relationship therewith. A third electrical contact is joined to the bottom surface of the wafer comprising a surface of a third region of semiconductivity in an electrically conductive relationship therewith.

DRAWINGS

For a better understanding of the nature and objects of the invention, reference should be had to the drawings, in which.

Figure 3:
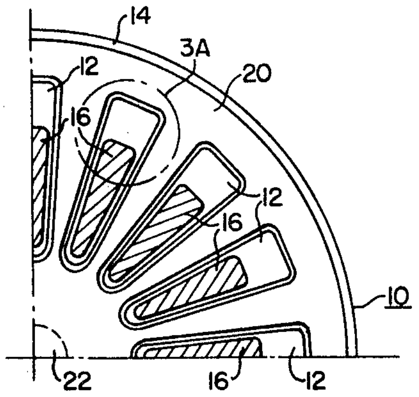
Figure 3A:
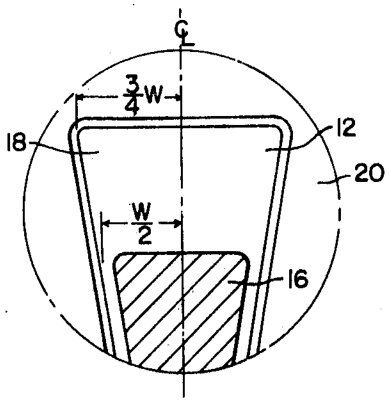
Figure 4:
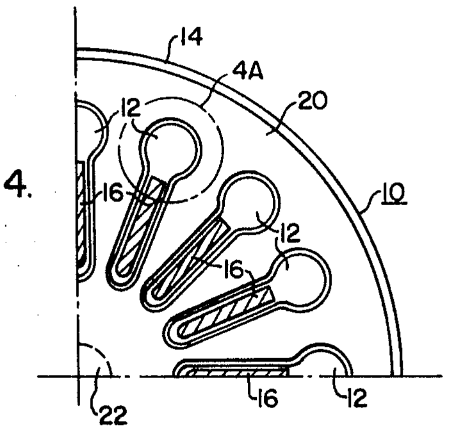
Figure 4A:
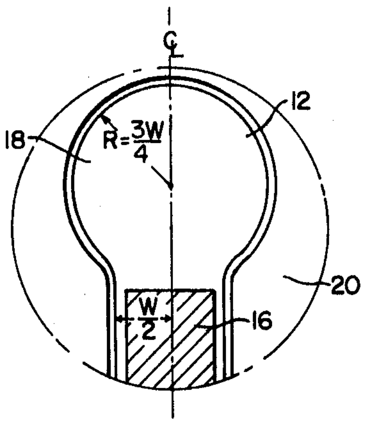
Figure 5:
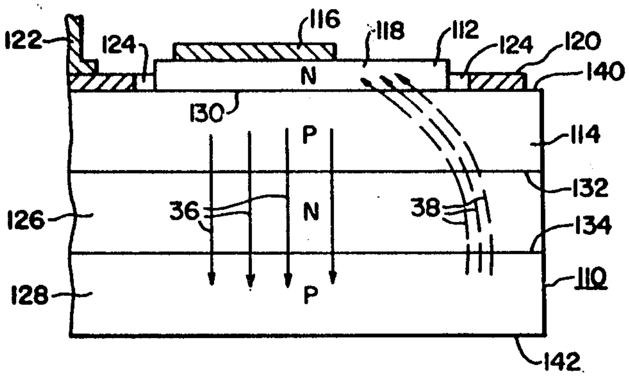
Figure 6:
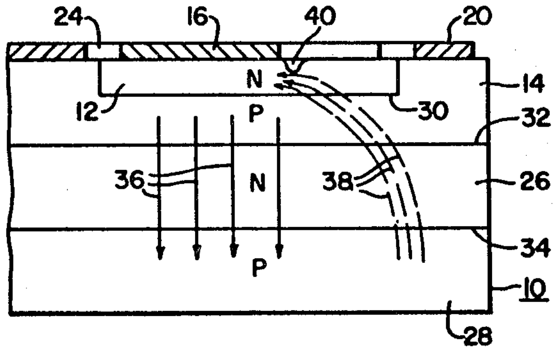
Figure 7:
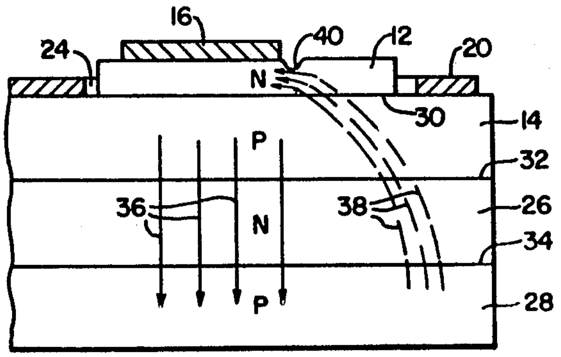

FIGS. 3 and 4 are top plan views, while FIGS. 3A and 4A are enlarged views of a portion of FIGS. 3 and 4, respectively, and FIGS. 5, 6 and 7 are cross-sectional views of portions of wafers modified in accordance with the teachings of this invention.

DESCRIPTION OF THE INVENTION

Figure 1:
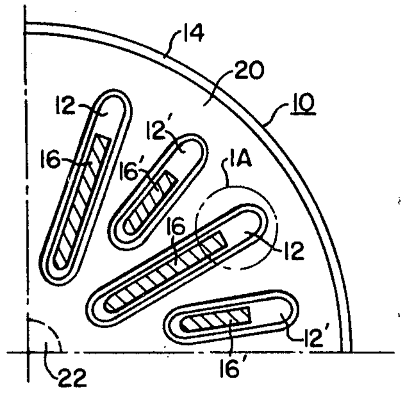
FIG. 1 is a top plan view and FIG. 1A is an enlarged view of a portion of a high current gate controlled switch made in accordance with the teachings of this invention.
Figure 1A:
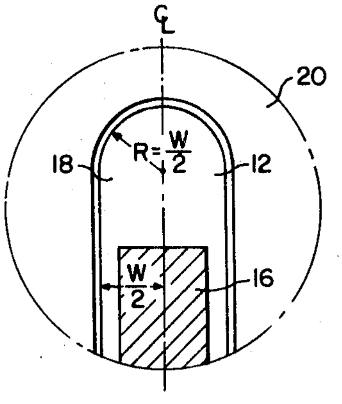
Figure 2:
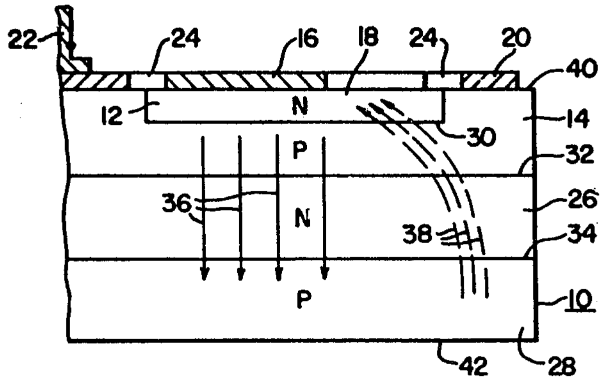
FIG. 2 is a cross-sectional view on line II—II of FIG. 1.

A cathode configuration for a high current gate controlled switch is shown in plan view in FIG. 1 and comprises a semiconductor element 10. As shown in FIG. 2, the semiconductor element 10 comprises a body of semiconductor material having a plurality of spaced first emitter or cathode regions 12, a first base or gate region 14, a second region 26, a second emitter region 28 and top and bottom surfaces 40 and 42. PN junctions 30, 32, and 34 are formed between each respective pair of regions of opposite type semiconductivity 12 and 14, 14 and 26, and 26 and 28. The element 10 may have a PNPN configuration or an NPNP configuration. As shown in FIGS. 1 and 2, the element 10 is a planar device wherein the top surfaces of each of the cathode regions 12 and the gate region 14 comprise the surface 40. Each cathode region 12 is entirely surrounded by a portion of the gate region 14. Not shown in detail is the treatment, for example, of beveling the wafer and coating of the circumferential edge of the element 10, for such treatment is well known in the art and not pertinent to the invention herein.

A first ohmic electrical contact 16 consisting of a layer of an electrically conductive metal, such for example, as aluminum, gold, silver, and the like, is joined to a portion of the region 12 in an electrically conductive relationship therewith. The contact 16 covers no more than two-thirds the surface area of each region 12. The remainder of the region 12 is an integral resistive portion 18. A second electrical contact, or gate contact, 20 consisting of an electrically conductive metal such, for example, as aluminum, gold, silver, and the like is joined to a portion of the region 14 in an electrically conductive relationship therewith. As shown in FIGS. 1 and 2, the switch has a configuration employing a center fired gate electrode 22 making electrical contact with the second electrical contact 20 in the central area thereof. The cathode region 12 and the gate region 14 are regions of opposite type semiconductivity and the respective electrical contacts 16 and 20 are electrically isolated from each other by an isolation space 24 formed therebetween.

Although each of the contacts 16 to a cathode region 12 is shown as being closer than the resistive portion to the gate contact 22, the reverse arrangement may also be employed.

Another configuration for the cathode region 12 is to alternate the unmetallized portions of the region 12 so that first one cathode region 12 has it located farthest from the gate electrode 22 and the next cathode region 12 has its unmetallized, or resistive portion, closest to the gate electrode 22. Additionally, the contact 16 may be comprised of several spaced portions with the unmetallized portions therebetween forming a plurality of resistive portions in each cathode region 12. However, there are several reasons why it is more desirable to orient the cathode regions 12 as shown. It is desirable that the resistive portions 18 of the cathodes 12 be kept in the coolest portion of the element 10. As shown in the figures the gate electrode 22 to the gate region 14 is at the center portion of the contact 20, and the most thermal energy is generated within the element 10 at this location where the gate current is flowing into the central portion of the region 14 and fanning out radially to the outer periphery of the element where the density of the gate current flow is less. Since the electrical properties of the resistive portion 18 will be least affected by the thermal energy created within the semiconductor element 10 in the outer peripheral portions, the resistive portions 18 are preferably located as shown.

Additionally, the outer peripheral portions of the semiconductor element 10 provide a greater area for cathode geometrical design and distribution of a number of cathodes. As shown in FIG. 1, smaller cathode regions 12, with contacts 16, are disposed between larger cathode regions 12. This arrangement provides as much current handling ability for the semiconductor element 10 as is reasonably possible with an adequate distance provided between adjacent cathode regions 12 to prevent the loss of gate drive.

The integral resistive portion 18 of the cathode region 12 is the last region through which current flows during shutdown of the semiconductor element 10. Therefore it is desirable that this current flow occur furthest from the electrical connection 22 to the gate contact 20 of the gate region 14. Consequently, since the electrical connection to the contact 20 is in the center, the resistive portion 18 is located as near the outer peripheral portion of the semiconductor element 10 as is feasible.

The cathode region 12, including the integral resistive portion 18 may have a uniform configuration as shown in FIG. 1 wherein the width of the region is substantially constant and the radius of the ends of the region is equal to one-half the width of the region 12. It is desirable however that the first electrical contact 16 extend no further than two-thirds the total length of the cathode region 12.

A better implementation is had if the resistive element 18 portion is greater in effective diameter than the width of the portion of the cathode region 12 to which the contact 16 is attached. All the current flowing through resistive element 18 should be caused to flow through a more restricted and hence resistive area as in the vicinity where the current enters the portion of the cathode region 12 beneath the contact 16 as illustrated in FIG. 1. A preferred geometry of the cathode region 12 is shown in FIG. 3, and another in FIG. 4. Preferably, the surface area of the resistive portion 18 has a radius which is at least 1½ times the distance of half the width of the remainder of the region 12.

An alternate construction of the semiconductor element 10 is shown in FIG. 5. In FIG. 5, a semiconductor element 110 having a mesa configuration is employed in a high current gate controlled switch. In a NPNP gate controlled switch configuration the semiconductor element 110 has regions 112 and 126 of N type semiconductivity and regions 114 and 128 of P type semiconductivity. PN junctions 130, 132, and 134 are between respective regions 112 and 114, 114 and 126, and 126 and 128. Electrical contacts 20 and 16 form ohmic electrical contacts to the respective regions 12 and !14. Electrode 122 is a gate electrode to contact 120. Semiconductor element 110 is exactly the same as the element 10 and functions in the same manner electrically, the only difference being in that the regions 112 project above the top surface 140 and the region 114.

When the device of this invention is operated the following occurs. In the normal operation of the semiconductor element 10 when a positive, or a forward, voltage is applied to each contact 16 of the plurality of cathode regions 12, on conduction the current largely is carried underneath the contact 16 of each region 12. Very little current spreads radially outward from the contact 16 through the sheet resistance of the cathode 12 to the portion 18. From an electrical circuitry viewpoint, the flow of current from the contact 16 occurs downward through the semiconductor element 10, as shown by the solid arrows 36, such that electrically it appears that the integral resistive portion 18 of the cathode region 12 does not even exist.

However, when the semiconductor element is shutting down beginning with the application of a negative, or a reverse, gate voltage to the contact 16 of the gate region 20, excess carriers are drawn by the contact 20 from the cathode region 12 nearest the electrode 22 of the gate contact 20. Excess carriers are still present in the resistive portion even when the gate region 20 has drawn all excess carriers from the metallized region 16 of the main cathode. The current from the load is presented with an alternate current path. This alternate current path is resistive and funnels the last current in the semiconductor element 10 through the sheet resistance of the integral resistive portion 18, namely the unmetallized portion of the cathode region 12, and through the remainder of the region 12 beneath the contact 16 as shown by the dashed arrows 38 in FIGS. 2 and 5. A smooth transfer of current flow occurs from directly beneath the contact 16 to a path through the integral resistive element 18. This smooth transfer of current enables the gate controlled switch, or the element 10, to have an equalized distribution of current throughout the cathode region 12 during the turnoff sequence of the switch. The effect is that all of the cathode regions 12 are carrying an equal current loading at shut down and consequently all of the cathode regions 12 are essentially shut off at the same time.

Even if one cathode region 12 is still on, it still has the integral resistive portion 18 providing resistance in the cathode lead. The gradual reduction of current provided by the resistive portion 18 of each cathode region 12 has reduced the value of the load current flowing through the element and consequently no burnout occurs which destroys the element 10 as has often occurred in prior art devices. As a result the realization of almost all of the full current capability of a gate controlled switch embodying the semiconductor element 10 is achieved.

It is to be noted therefore, the integral resistive portion 18 is functionally present during the time the gate controlled switch, or the semiconductor element 10, is being shut down. The integral resistive portion 18 is not functionally active, for any practical purpose, when the element 10 is functioning during application of a positive forward voltage to the cathode region 12 or during its normal operation.

Referring now to FIGS. 6 and 7 there is shown a modification made to the cathode regions 12 of the semiconductor element 10 to ensure the presence of a resistive path for the electrical current when the element is shutting down. Material is removed from the region 12 to provide a necked-down area 40 which causes the last current flowing in the element 10 to pass through a more resistive region of the cathode region 12 beneath the necked-down area 40.

Electrical contact to the regions 12 and 14 in all the modifications, may be either by attaching permanent leads or electrodes as by soldering to the contacts 16 and 20 of the respective regions, or by a multiple pressure electrical contact assembly as are employed in compression bonded electrical devices. The semiconductor element 10 or 110 is hermetically sealed within an electrical device. The regions 28 and 128 of the respective elements 10 and 110 are joined by an ohmic solder to a support electrode which in turn is supported by a thermally and electrically conductive support member of the electrical device. The cathode and gate regions are connected to electrical sources without the device by suitable electrical means such for example as separate electrical leads from the region joined to electrical terminals hermetically sealed within the outside surface of the device to which external electrical leads are attached. Preferably, for a compression bonded electrical device, the mesa configuration of FIG. 5 is employed and the gate electrode is passed through, but electrically insulated from at least a portion of the cathode contact.

The following is illustrative of the teachings of this invention:

Two wafers of silicon semiconductor material having two major opposed surfaces were lapped and etched to parallelism. The wafers were each of N type semiconductivity, 0.910 inch in diameter, 9½ mils in thickness and had a resistivity of 30 ohm-centimeter. Employing the sealed tube diffusion technique, gallium was diffused simultaneously through at least the two major opposed surfaces to convert each wafer to a basic PNP semiconductor structure. The source was metallic gallium heated to a temperature of 1000° C.±5° C. and the wafer during diffusion was heated to a temperature at 1230° C.±2° C. The diffusion time was 30 hours to produce each P region to a depth of 2½ mils.

Employing the open tube diffusion technique, phosphorous was deposited on each of the major surfaces of each wafer to form an N type semiconductivity region 0.3 mil thick having a surface impurity concentration level of $10^{21}$ atoms of phosphorus per cubic centimeter. The source of phosphorus was ammonium phosphate heated to 860° C.±5° C. and the wafers were heated to 1150° C.±2° C. The phosphorus deposition time was 45 minutes and the carrier gas was a gaseous mixture of nitrogen and oxygen.

Employing photolithographical techniques, selective etching of each of the wafers removed all of the phosphorous diffused material from one of the major opposed surfaces and the sides of each wafer and some of the gallium diffused material from the side surfaces of each wafer as well as forming 36 fingerlike cathode regions having a bulbous end at the outer end of each as shown in FIG. 4 but less the electrical contact material. The gate region 20 was etched deep enough to keep the PN junction between the phosphorus diffused region and the gallium diffused region above the bottom of the groove after a subsequent "phosphorous drive" process. A standard silicon etchant was employed.

The wafer was then placed in a phosphorus drive at 1250° C.±2° C. for one-half hour to produce an N type region of semiconductivity 12 to 16 microns deep. Metallic gold is then evaporated on the major back surface 1000A. thick in standard commercial equipment. This is then diffused into the wafer at 870° for 30 minutes in a furnace.

A molybdenum backup electrode was alloyed to the major back surface of the gallium diffused semiconductor region of each wafer employing a solder of 1 percent boron and the remainder aluminum in a furnace at a temperature of 700° C.±5° C. for a period of 10 minutes.

Each wafer was then placed in a metal vacuum evaporation chamber and a layer of aluminum of approximately 40,000A. was deposited on the wafer in the usual commercial equipment.

Employing photolithographical techniques embodying commercially available photoresist, such, for example as Kodak Metal Etch Resist, and selective etching with an etchant consisting of 50 percent by volume concentrated nitric acid and 50 percent by volume of concentrated phosphoric acid, the aluminum was removed from the isolation grooves 14 between the plurality of cathode regions and the gate region and the side surfaces as well as from the bulbous portion of each cathode region of one wafer to form the integral resistive element of each cathode region as shown in FIG. 4.

Photolithographical techniques and selective etching with an etchant consisting of 14 parts by volume of concentrated nitric acid, one part by volume of acetic acid and one part by volume of hydrofluoric acid was employed to produce a groove from 0.2 mil to 0.3 mil deep in the integral resistive element of each cathode region between the bulbous portion of the element and the metallized portion of the cathode region as shown in FIG. 7.

The aluminum electrical contact metal was sintered to the respective regions in a furnace at 500° C.±10° C. for 15 minutes.

Each processed wafer was then further processed by beveling and spin etching the peripheral edges of the wafer to control the electrical field of the regions and to isolate the blocking junction in each element. All exposed semiconductor material surfaces were coated with a room temperature drying varnish material to passivate the surfaces and exposed PN junctions therein.

Each processed wafer was then subjected to an electrical test as a gate controlled switch. The contact to the gate region was at the center of the gate region of the wafer. Using 5 cathode regions 12 of a processed wafer having a metal electrical contact over essentially all of each of the cathode regions, the device 10 was able to turn off no more than a 30 ampere current in less than 2 microseconds. Five cathode regions on a processed wafer embodying the integral resistive element in each cathode region was able to switch off more than a 70 ampere current in less than 2 microseconds.

The results obtained show that the wafer processed in accordance to the teachings of this invention is superior to the prior art wafer. The employment of an integral resistive element in each cathode region does cause the last current flowing in the switch when it is being turned off to pass through the integral resistive element. The integral resistive element does distribute the current flow more equally between all of the cathode regions and this is not true with the prior art device since it burned out at slightly above 30 amperes when tested further. The turn off time of the two processed wafers was the same for their respective current handling capabilities. The processed wafer embodying the teachings of this invention better utilize the cathode region geometry than the prior art device.

I claim:

1. A high current gate controlled switch comprising a wafer of semiconductor material, said wafer having a top and bottom surface, said wafer having a plurality of first regions of first type semiconductivity and a second region of second type semiconductivity exposed on said top surface, each of said plurality of first regions being encircled by a portion of the second region, a plurality of first electrical contacts, each first electrical contact being disposed upon and joined in an electrically conductive relationship with a first region, each of the first contacts being disposed on only a portion of the surface of the respective first region to which it is joined, the remaining portion of the first region being an integral resistive portion, the radius of the integral resistive portion being greater than one-half the width of the remaining portion of the first region, a second electrical contact joined to the second region in an electrically conductive relationship therewith, and a third electrical contact joined to the bottom surface of the wafer comprising a surface of a third region of semiconductivity and in an electrically conductive relationship therewith.

2. The high-current gate controlled switch of claim 1, wherein the plurality of first regions comprises at least a first portion of a first size disposed between adjacent first regions of a larger size than the first portion.

3. The high-current gate controlled switch of claim 1, wherein each of the plurality of first regions are disposed in a radial configuration from the center of the wafer.

4. The high current gate controlled switch of claim 1 wherein the integral resistive element of each of the plurality of first regions has a necked-down region adjacent to the first part of the first region.

5. The high current gate controlled switch of claim 1 wherein each of the plurality of first regions projects above the second region and the integral resistive element has a necked-down region adjacent to the first part of the first region.

6. The high current gate controlled switch of claim 1 wherein each first electrical contact is disposed on no greater than two-thirds the surface of the respective first region to which it is joined.

7. In an electrical device, a four region semiconductor gate controlled switch having a plurality of cathode regions, each of the cathode regions being entirely surrounded by a portion of a common gate region, an ohmic contact applied to only a portion of a surface of each cathode region said portion being no greater than two-thirds of the surface, and leaving a contiguous portion of the cathode region with no contact applied thereto to provide a resistive portion and a gate electrode applied to the common gate region whereby on turnoff of the electrical device, residual current within the switch tends to flow through the resistive portion of each of the plurality of cathode regions and thereby effecting equalization of the current and all of the cathode regions turn off at substantially the same time.

8. The electrical device of claim 7 wherein the resistive portion of each cathode region has a radius greater than one-half the width of the remaining portion of the cathode region.